US007003261B2

(12) United States Patent
Dietz et al.

(10) Patent No.: US 7,003,261 B2
(45) Date of Patent: Feb. 21, 2006

(54) EXPANDING THE SCOPE OF COVERAGE OF WIRELESS CELLULAR TELEPHONE SYSTEMS INTO REGIONS BEYOND THE CELLULAR ARRAY AREAS BY PROLIFERATING THE INSTALLATION OF TRANSMISSION REPEATERS INTO AUTOMOBILES THAT MAY BE RANDOMLY DRIVEN WITHIN THESE REGIONS

(75) Inventors: Timothy Alan Dietz, Austin, TX (US); Walid Kobrosly, Round Rock, TX (US); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/205,674

(22) Filed: Jul. 25, 2002

(65) Prior Publication Data

US 2004/0203706 A1 Oct. 14, 2004

(51) Int. Cl.
*H04B 7/15* (2006.01)

(52) U.S. Cl. ...................... 455/11.1; 455/16; 455/13.1; 455/446; 340/905

(58) Field of Classification Search ............... 455/11.1, 455/16, 561, 560, 434, 440, 8, 527, 512, 455/13.1, 15, 446, 422.1; 340/905
See application file for complete search history.

(56) References Cited

U.S. PATENT DOCUMENTS 5,842,132 A * 11/1998 Fukutomi ................ 455/456.1
6,097,968 A * 8/2000 Bannister et al. ........... 455/561
6,236,337 B1 * 5/2001 Beier et al. ................. 340/905
6,785,511 B1 * 8/2004 Hengeveld et al. ........... 455/16
6,795,685 B1 * 9/2004 Walkup ..................... 455/11.1
2004/0102219 A1 * 5/2004 Bunton et al. .............. 455/560
2004/0192193 A1 * 9/2004 Silvester .................... 455/11.1

* cited by examiner

*Primary Examiner*—Lester G. Kincaid
*Assistant Examiner*—Phuoc Doan
(74) *Attorney, Agent, or Firm*—Jerry B. Kraft; Mark E. McBurney

(57) ABSTRACT

If RF transmission repeater units could be mounted in as many automobiles as possible, particularly automobiles owned by drivers residing in low population regions, the likelihood would increase that there could be established wireless transmission paths between a wireless telephone unit and cellular array base stations, including a set of at least one automobile mounted repeater unit intermediate and independent of said wireless telephone unit and said base station. With enough automobiles with mounted repeaters travelling in the remoter regions, there would be a reasonable likelihood that such sequential sets of repeaters connecting to base towers of adjacent cellular arrays could be randomly established. The situation could occur that two or more alternate paths could be establishable between a cellular telephone and cell base stations via two different sets of repeaters. In such a case, as set forth hereinafter in greater detail, there are likely to be different cell base stations, each for a different path. In such a case, any conflict could be resolved by selecting the path having the best transmission attributes. This conflict could readily be resolved through conventional cellular telephone system technology that switches moving cell phones within cellular array areas that "hand-off" or switch a moving cell phone as it moves from conventional cell to cell. This hand-off is based upon attributes like signal-to-noise ratio or strength of signal.

3 Claims, 5 Drawing Sheets

EXPANDING THE SCOPE OF COVERAGE OF WIRELESS CELLULAR TELEPHONE SYSTEMS INTO REGIONS BEYOND THE CELLULAR ARRAY AREAS BY PROLIFERATING THE INSTALLATION OF TRANSMISSION REPEATERS INTO AUTOMOBILES THAT MAY BE RANDOMLY DRIVEN WITHIN THESE REGIONS

TECHNICAL FIELD

The present invention relates to telecommunications systems and particularly to mobile wireless cellular telephone systems.

BACKGROUND OF RELATED ART

With the globalization of business, industry and trade wherein transactions and activities within these fields have been changing from localized organizations to diverse transactions over the face of the world, the telecommunication industries have been expanding rapidly. Wireless telephones and, particularly, cellular telephones have become so pervasive that their world wide number is in the order of hundreds of millions. While the embodiment to be subsequently described relates to cellular telephones, the principles of the invention would be applicable to any wireless personal communication device that could be used to communicate in a cellular telecommunications system. These would include the wide variety of currently available communicating personal palm devices or Personal Digital Assistants (PDAs), which include, for example, Microsoft's WinCE line; the PalmPilot line produced by 3Com Corp.; and International Business Machine Corporation's WorkPad. These devices are comprehensively described in the text, *Palm III* & *PalmPilot,* Jeff Carlson, Peachpit Press, 1998. Thus, when the term, wireless telephone is used herein, it is meant to include such devices.

Despite the large numbers of cellular telephones currently in use, the global geographical areas within which cellular telephones may effectively be used remains quite limited. In order to be effectively used the cellular phone must be in range of a cellular array area base tower. While such cellular arrays are present in high population density areas, there is no economic justification to extend such cellular arrays to great portions of United States having low population densities. However, since our society is becoming more global and mobile, a great deal of business and personal activity does take place in these low population density areas and the industry is seeking ways to extend cellular telephone service to such sparse population areas.

In order to better understand the nature of this challenge, the principal forms of telecommunication should be briefly considered. The standard wired telecommunications system, which has been in use world wide for well over 100 years, is the conventional handheld or speaker input wired into a base that in turn is wired into a Public Switched Telephone Network (PSTN) with wired switched channel paths to and from other telephones or like devices through their bases. These telephones are respectively connected to the PSTN via local switching centers or switching nodes in a fully wired telecommunication system. Conventionally these switching centers have many telephones connected to each. The centers operate to control the channel connections, i.e. switch into and out of the PSTN, those calls originated or terminated at telephone stations.

In addition, there have been developed, over the past 20 years, two major mobile wireless systems: 1) the short range wireless radio frequency (RF) "cordless" telephone system; and 2) the mobile wireless long range RF "wireless" telephone system that has been commercialized primarily as the "cellular" telephone system.

The cordless telephone is basically a combination telephone and RF receiver/transmitter. The cordless phone has a base and a handset. The base is wired through any standard phone jack into the conventional PSTN. The base receives the incoming call as a normal phone line signal, converts the signal into an FM RF signal (preferably digital in present technology) and broadcasts the signal over a short range to the mobile handset that receives the signal and converts it into the analog signal that is heard over the phone. When the user speaks, the handset converts the analog speech signal into an FM RF digital signal that is broadcast back to the base that in turn receives and converts the signal back into the line signal to the PSTN. Thus, the cordless telephone base looks like and operates like a conventional wired phone base as far as the PSTN is concerned. The one thing that the cellular long range communication system has in common with the short range cordless system is that both eventually have a base station that looks and acts like a standard wired telephone base with respect to the PSTN.

Before the cellular wireless phone system was developed, long range mobile wireless phones were relatively rudimentary; they were usually in automobiles. There was usually one central tower with about 25 channels available on the tower. The mobile wireless telephone needed a large powerful transmitter, usually in the automobile that had to transmit up to 50 miles. This was too cumbersome for any personal or portable phone. In the cellular system for the handheld mobile wireless phone, an area such as a city is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate what cell the client mobile phone is in. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824–894 MHz ranges. Since transmissions between the cell telephone and cell tower are digital, but the speaker and microphone in the telephone are analog, the cell telephone has to have a D to A converter from the input to the phone speaker, and an A to D converter from the microphone to the output to the cell tower.

Although cellular arrays offer a very effective means of wireless communications within their array areas in the order of 10 square miles each, the challenge is extend the cellular array ranges beyond the limits of the array areas.

SUMMARY OF THE PRESENT INVENTION

The present invention provides one potential satisfaction to this challenge. The invention involves the recognition that the automobile has a prevalent presence in most lower population density regions. Thus, if RF transmission repeater units could be mounted in as many automobiles as possible, and particularly automobiles owned by drivers residing in low population regions, the likelihood would increase that there could be established wireless transmission paths between a wireless telephone unit and one of the cell base stations including a set of at least one automobile mounted repeater unit intermediate and independent of said wireless telephone unit and said base station. With enough automobiles with mounted repeaters travelling in the remoter outer regions, there would be a reasonable likelihood that such sequential sets of repeaters could be randomly established.

In accordance with a further aspect of the present invention, the situation could occur that two or more alternate paths could be establishable between a cellular telephone and cell base stations via two different sets of repeaters. In such a case, as will be set forth hereinafter in greater detail, there are likely to be different cell base stations, each for a different path. Any conflict could be resolved by selecting the path having the best transmission attributes. This selection could be made through conventional cellular telephone system technology that switches a moving cell phone within cellular array areas that "hand-off" or switch such a moving cell phone as it moves from conventional cell-to-cell. This hand-off is based upon attributes such as signal-to-noise ratio or strength of signal.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
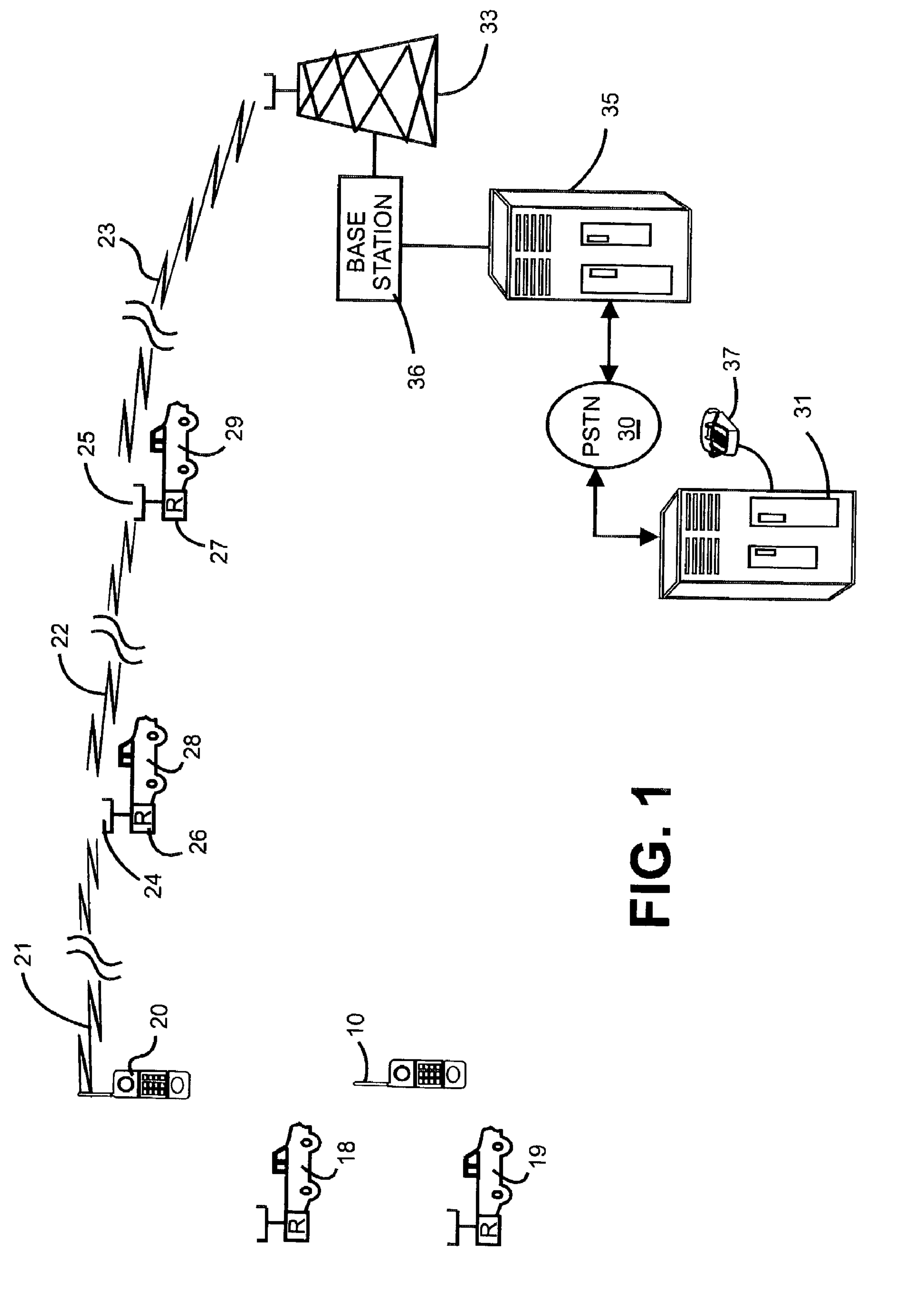
FIG. 1 is a generalized diagrammatic view of a portion of a cellular base station connected to a Public Switched Transmission Network showing a path through automobile mounted repeaters to and from the cellular base station tower in accordance with the invention.

Referring to FIG. 1, there is shown a generalized diagrammatic view of a portion of a cellular telephone network connected into a conventional Public Switched Telephone Network (PSTN) showing channel paths to and from both conventional wired and mobile wireless channels and cellular devices according to the present invention. Let us assume that cellular telephones 10 and 20 are representative of the many mobile cell phones that are in regions beyond the range of the cellular area set up as represented by cell tower 33 connected to a cell base station 36. Cell phones 10 and 20 may be in the hands of pedestrians or being held and used in moving automobiles. If the present invention is effectively applied, the regions beyond the effective range of tower 33 will be proliferated with automobiles 28, 29, 18 and 19, each having a mounted transmission repeater (R), 26 and 27 with transmission antennae 24 and 25. In the random driving of the automobiles, their repeaters are on and seek to be connected to a cell base tower, such as tower 33, or be connected to another repeater that is already connected to a base tower. The connection to a tower being sought would be either an initial connection to a tower or connection to the tower via a sequence of "hops", i.e. links through automobile repeaters that are already connected. For example, automobile repeater 27 is connected to cell base tower 33 by one hop 23 while the next further automobile repeater 26 is connected to tower 33 by two hops 22 and 23.

Each automobile repeater may be dynamically assigned an appropriate ID indicative of the base tower and the number of hops in the sequence to the tower, e.g. "n(NB)", where NB is the identifier of the base tower, (in the present example 33) and n is the number of hops in the sequence. It should be noted in the decisions as to which alternate transmission paths to towers should be taken or switched to that will be described subsequently, this sequence identifier could be used in the designation of the paths having the best attributes.

Accordingly, in the example of FIG. 1, mobile cell phone 20 has been randomly fortunate enough to be able to connect via transmission 21 to the terminal repeater 26 in the two hop sequence to base tower 33. On the other hand, mobile cell phone 10 has not been close enough to link into such a sequence. This does not mean that cell phone 10 is totally inoperative. Conventionally, cellular telephone systems may transmit as well as receive beyond the effective cell array areas but the signal will be very weak and/or of poor quality. Automobiles 18 and 19 with mounted transmission units are just shown to represent automobiles randomly driven in the region that have not gotten within repeater range of either a base tower or of the terminal repeater in a sequence of repeaters connected to a base tower.

It should also be understood that while the present invention uses a sequential set of mobile repeaters connected to a cell tower, the path to the tower may also include incidental repeaters that are not moving, e.g. in parked cars or otherwise stationary. Also, the cell phones may be operated out of automobiles having mounted repeaters. In such a case, it is probable that the repeater will have a transmission range greater than that of the cell phone and, thus, the cell phone signals would be boosted through the associated automobile repeater.

The repeaters mounted in the automobiles could use conventional repeater technology. Stationary repeaters are currently mounted in shopping malls, parking garages, hospitals and steel hulled ships to enhance cell phone reception. The repeater may conventionally be based upon a duplexed bidirectional amplifier operational at the MHz bandwidth of the cellular system combined with appropriately mounted antennae, the cell phone signal repeaters are available from CellAntenna Corporation or Powertec Corp., among others.

Once appropriate contact is established with tower 33, the transmission would be conventional. The signals are passed through base station 36 to switching center 46 that then controls the routing of the call to PSTN 30. The various switching centers 31 within the PSTN system have associated channel activity state monitors 46 to track activity for billing and other purposes involving telephone customers 37.

Figure 2:
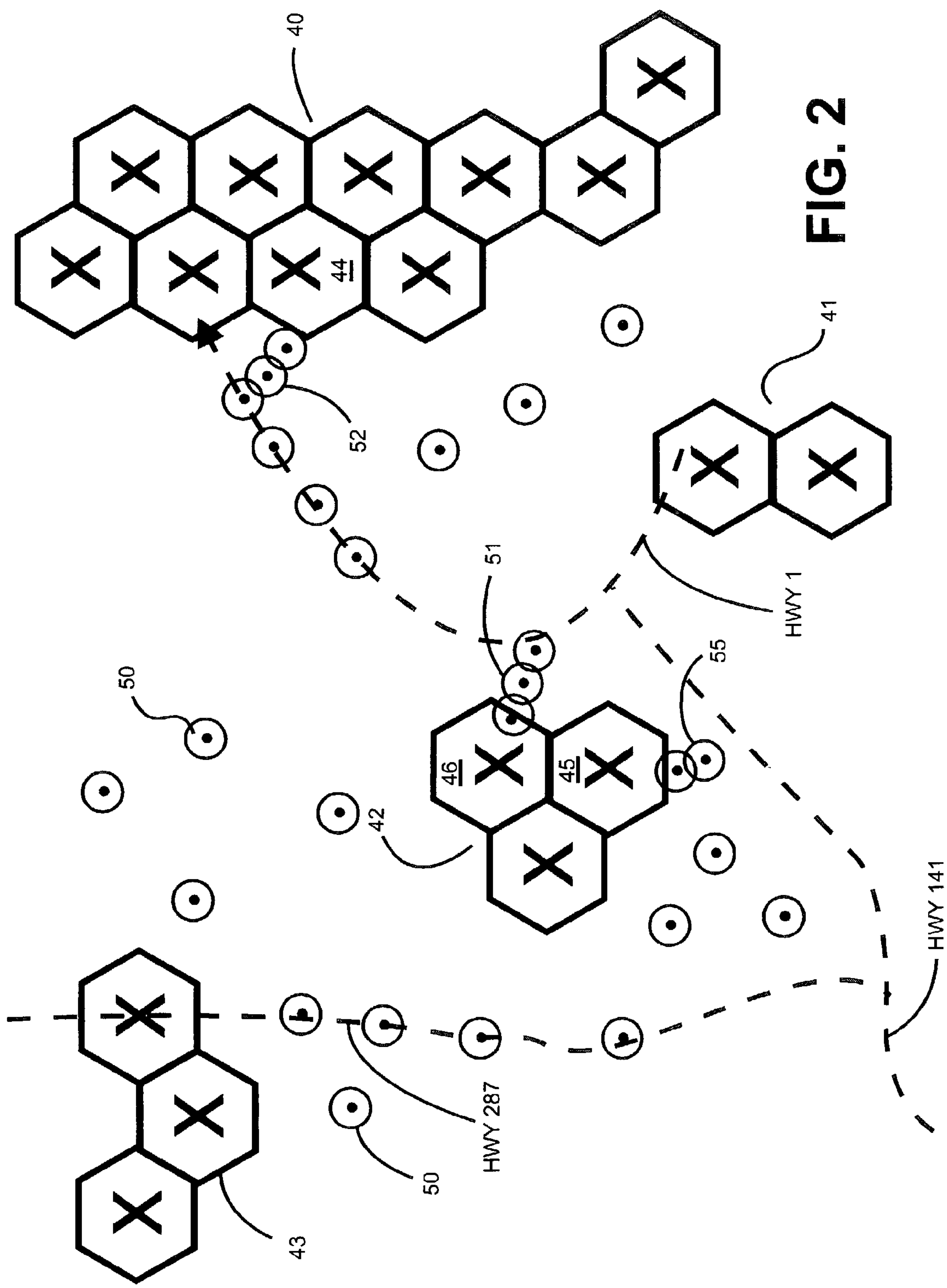
FIG. 2 is a plan or map view geographical region showing the layout of cellular arrays, base towers, randomly travelling automobiles with mounted repeaters and sequences of linked repeaters connected to base towers.

Now, with respect to FIGS. 2 and 3, there will be described some examples of the logistics of the invention involving sequential transmission of cell phone signals to cell base towers via sequences of transmission repeaters mounted on randomly moving automobiles. In FIG. 2, we have an overhead map view of a region with dimensions exaggerated to illustrate the invention. Each area cell is represented by a hexagon, such as 44 or 46, with its base tower shown as an X. The cell areas are clustered in arrays representative of high density population centers, such cities or towns, e.g. clusters 40, 41, 42 and 43. Each repeater mounted in a randomly moving automobile is indicated by a dot, and the transmission range of the repeater is indicated by the circle 50 surrounding the dot. When reference is made to the repeaters being randomly moving, we do not mean that the automobiles do not have directions and destinations that, of course, they would be expected to have. We mean that the directions and destinations of the automobiles have no relationship and, thus, are random with respect to the cell phones and cellular transmissions.

The regions between the cellular array clusters are the regions where the cell phone communications are to be enhanced. Three major highways are illustrated: HWY 287, HWY 1 and HWY 141. They should have greater automobile density travel and, thus, are more likely to have enough repeater mounted automobiles close enough to each other that transmission paths in accordance with the present invention may be more easily established. Three such paths are shown: 51 to cell 46, 52 to cell 44 and 55 to cell 45. Thus, sequences 51, 52 and 55 act as extensions of their respective cells into the region beyond the cell arrays. Any connection by any cell phone to either sequential path 51, 52 or 55 would appear to be a direct connection to the tower of the cell associated with the sequence.

Figure 3:
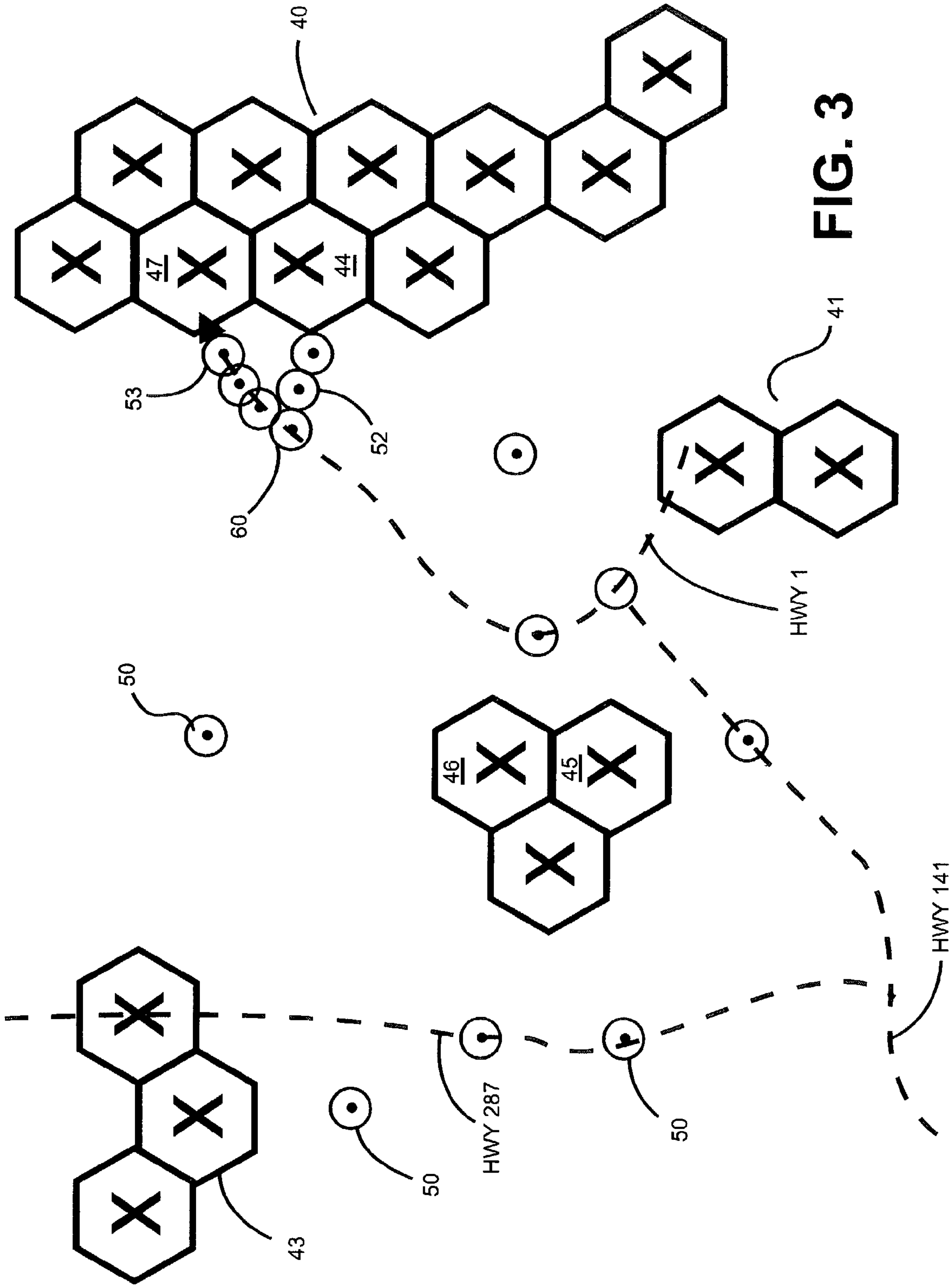
FIG. 3 is a plan view like that of FIG. 2, but with a different travelling automobile repeater arrangement to illustration how the best alternate path is selected.

FIG. 3 is in effect the illustration of FIG. 2 but modified to show an aspect of the invention involving a choice between alternative transmission paths. A cellular telephone linked to repeater 60 would have a choice between two transmission paths: path 53 to cell 47 or path 52 to cell 44. Such a conflict could be resolved by using conventional cellular system techniques. For example, if a cell phone within the conventional array were moving at the border between cells 44 and 47, appropriate choices of cell would be made using standard switching parameters, such as signal attributes, e.g. strength of signal or signal-to-noise ratios. Conventionally, each cell array in a cellular telephone system has a MTSO to control such switching in all cells in the particular array. In such a system, the base stations in the two edge cells would coordinate with each other through the MTSO, and at some point, the cell for which the signal strength is diminishing would hand-off the cell phone to the cell for which the signal strength is increasing. In the present example, since sequential repeater paths 52 and 53 are, in effect, respectively extensions of adjacent cells 44 and 47, the same hand-off or switching protocols would be applicable.

Figure 4:
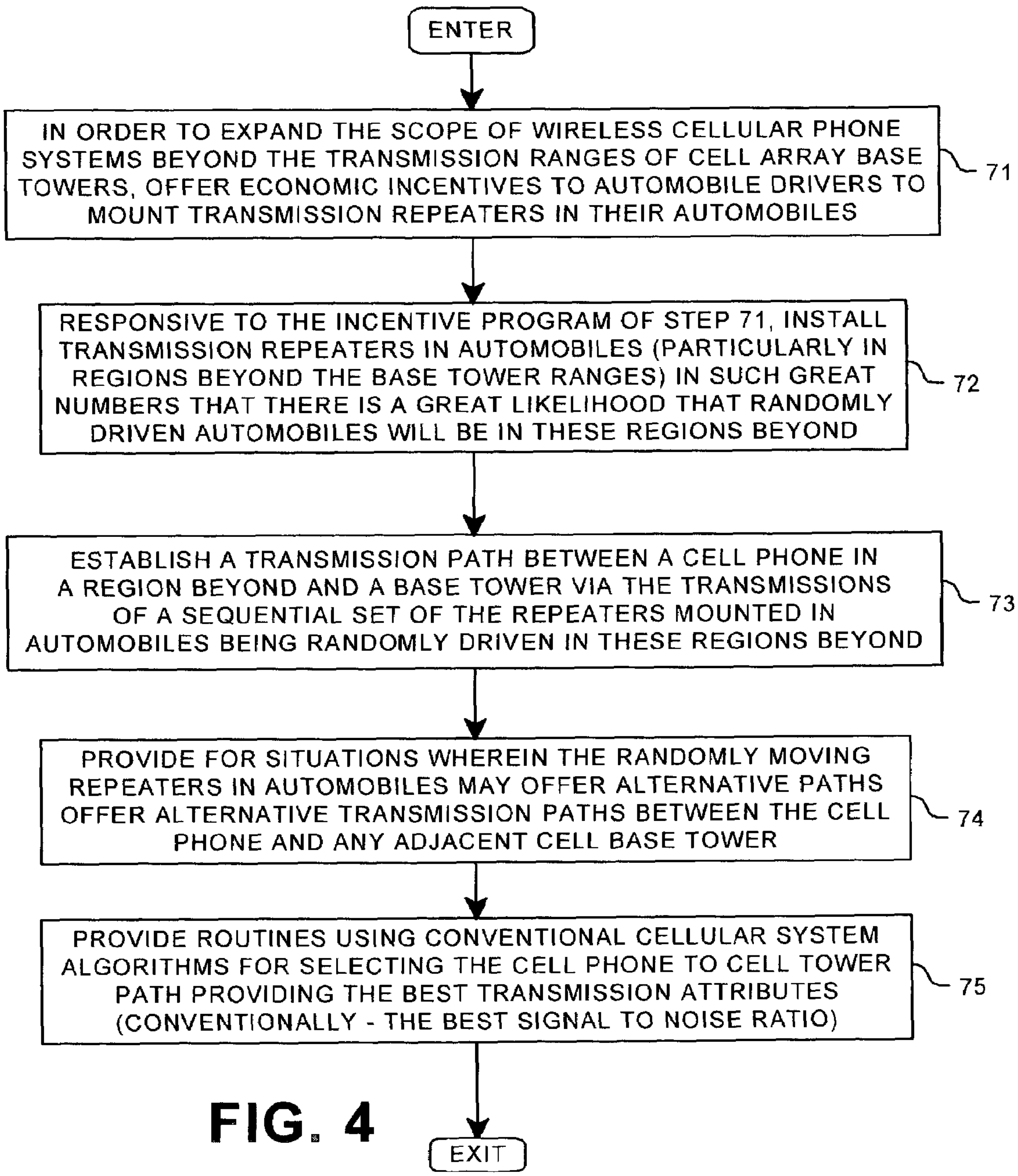
FIG. 4 is a flowchart describing how the cellular telephone system of the present invention provides for the handling of transmissions from cell phones in regions outside of the ranges of the cell array towers.

Now, with reference to the programming shown in FIG. 4, there will be described how the system and programs of the present invention are set up. In order to implement the present invention, to extend the ranges of cellular array towers into adjacent regions beyond the effective transmission ranges of the towers, a business program of economic incentives should be offered to get as many cars as possible regularly driven in these regions to permit the mounting of transmission repeaters in the automobiles, step 71. Such incentives could include reduction of rates for cell phone users permitting the installation. Since these repeater systems could be associated with the electronic radio/audio systems in automobiles, those who have the repeaters installed could be offered a free audio system.

Assuming considerable success for step 71, then with such extensive installation of the repeaters, there is a substantial likelihood that automobiles with such functioning repeaters would be extensively randomly available in the regions beyond the cell array ranges, step 72. As a result, there would be the increased ability to establish transmission paths between a cell phone within this region outside of cell arrays with a base tower in a cell through the transmissions of a sequential set of repeaters mounted in automobiles being randomly driven in these regions, step 73. There is provision for situations where the randomly moving repeaters in automobiles may offer alternative transmission paths between the particular cell phone and any adjacent base tower, step 74. Routines are provided using conventional cellular system protocols for selecting cell phone to tower paths providing the best transmission attributes: the best to noise ratio or strongest signal, step 75.

Figure 5:
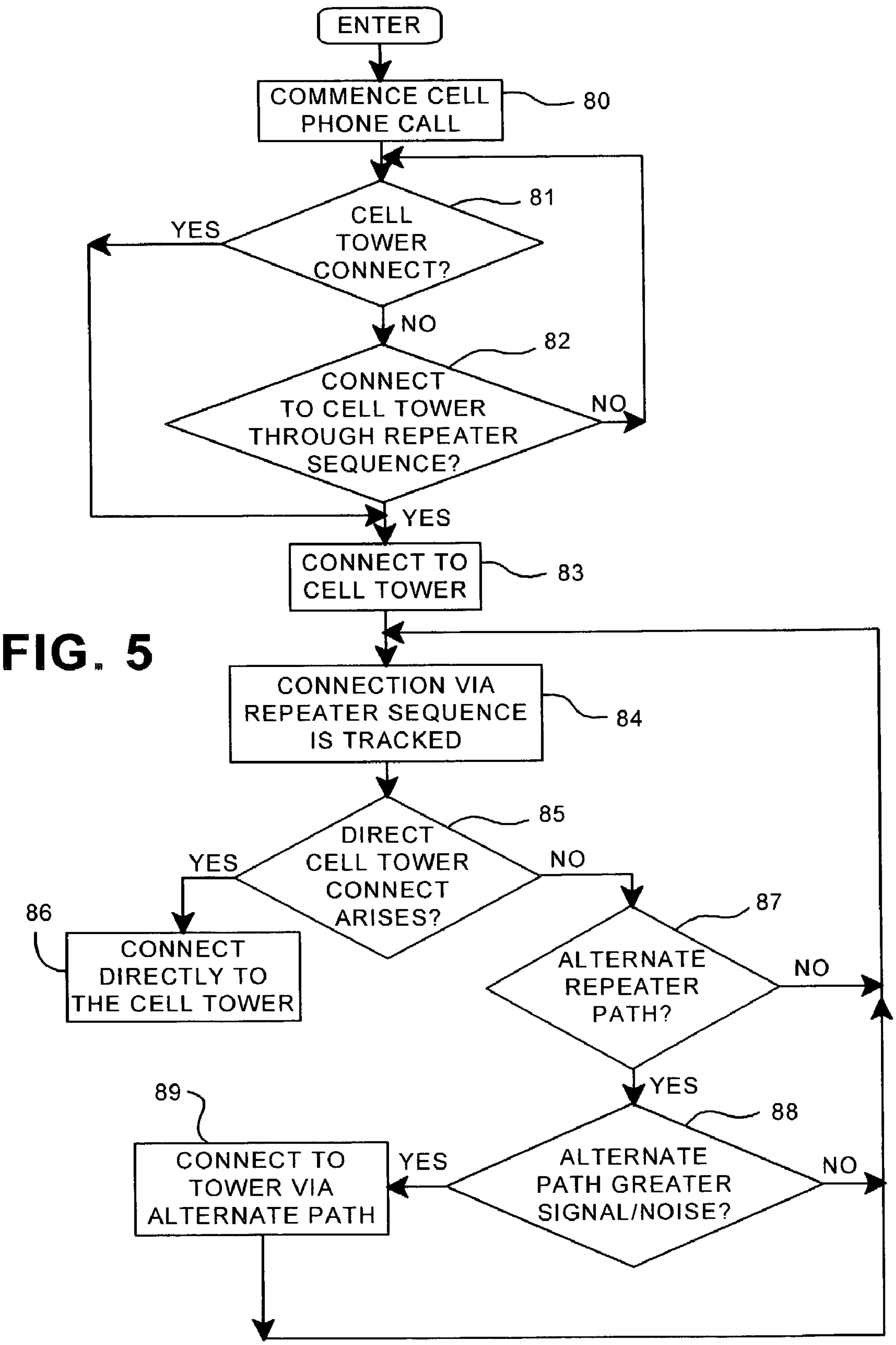
FIG. 5 is a flowchart of an illustrative run of a process set up in FIG. 4.

Now, with reference to the flowchart of FIG. 5, a simplified illustrative run of the process set up in FIG. 4 will be described. A cellular telephone call is commenced, step 80. An initial determination is made as to whether a connection to a cell tower may be made, step 81. If Yes, a direct connection to a cell tower is made, step 83. If No, then a further determination is made as to whether there is a connection available through the sequence of repeaters in accordance with the present invention, step 82. If Yes, then a connection is made to a cell tower through the repeater sequence, step 83. If the determination in step 82 is No, then the call process is returned to step 81 where a tower connection, either direct or through a repeater sequence is sought.

Assuming now that we have a sequential repeater connection to a tower that is being tracked (in MTSO), step 84, then a further determination is made, as to whether the cell phone making the call is close enough to a cell tower that a direct connection may be made to the tower, step 85. If Yes, a direct connection to the cell tower is made, step 86, and the cell phone switches and continues with this direct connection. If the determination in step 85 is No, then a further determination is made, step 87, as to whether an alternative path has become available through another sequence of repeaters. If No, the process is returned to step 84 and the tracking of the connection to tower via the sequence of repeaters continues. If the decision in step 87 is Yes, an alternate path has come up, then a determination is made, step 88, as to whether the alternate path has better transmission attributes, e.g. a better signal-to-noise ratio. If Yes, then the cell phone is connected to a cell base tower via the alternate path, step 89. Then, or if the determination from step 88 is No, the process is returned to step 84 and the tracking of the connection to tower via the appropriate sequence of repeaters continues.

Although certain preferred embodiments have been shown and described, it will be understood that many changes and modifications may be made therein without departing from the scope and intent of the appended claims.

What is claimed is:

1. In cellular telephone systems having arrays of cellular areas with a base station in each area, a method of expanding the scope and usage of the system into regions beyond the cellular areas of the system comprising:

offering economic incentives to drivers of automotive vehicles to mount repeaters in the vehicles;

mounting said repeaters on numbers of vehicles so great that there is a substantial likelihood that randomly driven vehicles with repeaters will be in the regions beyond the cellular areas of the system;

establishing two alternate transmission paths between a mobile wireless telephone in said regions beyond and a base station in a cellular area via a sequential set of a plurality of said repeaters mounted in said randomly driven vehicles; and selecting the transmission path having the best transmission attributes based upon the signal-to-noise ratio of the transmission.

2. In cellular telephone network having arrays of cellular areas with a base station in each area, a system for expanding the scope and usage of the system into regions beyond the cellular areas of the system comprising:

means for offering economic incentives to drivers of automotive vehicles to mount repeaters in the vehicles;

means for mounting said repeaters on numbers of vehicles so great that there is a substantial likelihood that randomly driven vehicles with repeaters will be in the regions beyond the cellular areas of the system;

means for establishing two alternate transmission paths between a mobile wireless telephone in said regions beyond and a base station in a cellular area via a sequential set of a plurality of said repeaters mounted in said randomly driven vehicles; and means for selecting the transmission path having the best transmission attributes based upon the signal-to-noise ratio of the transmission.

3. A computer program having code recorded on a computer readable medium for expanding the scope and usage of a cellular telephone system having arrays of cellular areas with a base station in each area into regions beyond the cellular areas of the system comprising:

means for offering economic incentives to drivers of automotive vehicles to mount repeaters in the vehicles;

means for mounting said repeaters on numbers of vehicles so great that there is a substantial likelihood that randomly driven vehicles with repeaters will be in the regions beyond the cellular areas of the system;

means for establishing two alternate transmission paths between a mobile wireless telephone in said regions beyond and a base station in a cellular area via a sequential set of a plurality of said repeaters mounted in said randomly driven vehicles; and means for selecting the transmission path having the best transmission attributes based upon the signal-to-noise ratio of the transmission.

* * * * *